(12) United States Patent
Baek et al.

(10) Patent No.: US 12,000,443 B2
(45) Date of Patent: Jun. 4, 2024

(54) BRAKE ASSEMBLY WITH ACTIVE PISTON RETRACTION

(71) Applicant: HL MANDO CORPORATION, Gyeonggi-do (KR)

(72) Inventors: Hyungjin Baek, Novi, MI (US); Daniel Smith, Novi, MI (US)

(73) Assignee: HL MANDO CORPORATION, Gyeonggi-Do (KR)

( * ) Notice: Subject to any disclaimer, the term of this patent is extended or adjusted under 35 U.S.C. 154(b) by 98 days.

(21) Appl. No.: 17/502,021

(22) Filed: Oct. 14, 2021

(65) Prior Publication Data
US 2023/0123351 A1   Apr. 20, 2023

(51) Int. Cl.

| | | |
|---|---|---|
| *B60T 13/74* | (2006.01) | |
| *B60T 1/06* | (2006.01) | |
| *B60T 13/58* | (2006.01) | |
| *F16D 55/226* | (2006.01) | |
| *F16D 65/18* | (2006.01) | |
| *F16D 65/42* | (2006.01) | |
| *F16D 65/38* | (2006.01) | |
| *F16D 121/24* | (2012.01) | |
| *F16D 125/40* | (2012.01) | |
| *F16D 125/58* | (2012.01) | |

(Continued)

(52) U.S. Cl.
CPC ............ *F16D 55/226* (2013.01); *B60T 1/065* (2013.01); *B60T 13/58* (2013.01); *B60T 13/741* (2013.01); *B60T 13/746* (2013.01); *F16D 65/183* (2013.01); *F16D 65/42* (2013.01); *F16D 2065/386* (2013.01); *F16D 2121/24* (2013.01); *F16D 2125/40* (2013.01); *F16D 2125/58* (2013.01); *F16D 2127/02* (2013.01); *F16H 25/20* (2013.01); *F16H 2025/2075* (2013.01)

(58) Field of Classification Search
CPC ................. F16D 55/226; F16D 65/183; F16D 2065/386; F16D 2121/24; F16D 2125/58; F16D 2127/02; B60T 13/58; B60T 13/741; B60T 13/746
See application file for complete search history.

(56) References Cited

U.S. PATENT DOCUMENTS

2017/0159733 A1* 6/2017 Chelaidite ............... F16D 65/14
2018/0298963 A1* 10/2018 Demorais ............. F16D 55/225
(Continued)

FOREIGN PATENT DOCUMENTS

KR   10-2019-0096828   8/2019

*Primary Examiner* — Nicholas J Lane
(74) *Attorney, Agent, or Firm* — Ladas & Parry, LLP

(57) ABSTRACT

A brake assembly comprises: a brake piston configured to be movable for a brake apply or release and having an inner wall forming a piston cavity, wherein a groove is formed on the inner wall of the brake piston; a linearly movable structure positioned within the piston cavity of the brake piston and configured to be linearly movable within the piston cavity; and a resilient material, wherein a part of the resilient material is located within the groove formed on the inner wall of the brake piston and the other part of the resilient material is disposed on an outer surface of the linearly movable structure so that the resilient material is engageable with a surface of the groove formed on the inner wall of the brake piston to move the brake piston by restoring force of the resilient material in response to linear movement of the linearly movable structure.

20 Claims, 17 Drawing Sheets

(51) Int. Cl.
*F16D 127/02* (2012.01)
*F16H 25/20* (2006.01)

(56) References Cited

U.S. PATENT DOCUMENTS

| | | |
|---|---|---|
| 2018/0298969 A1* | 10/2018 | Demorais ............. F16D 55/226 |
| 2019/0277355 A1* | 9/2019 | Kim ........................ F16D 65/18 |
| 2020/0256414 A1 | 8/2020 | Gerber et al. |
| 2022/0025947 A1* | 1/2022 | Baek ..................... F16D 65/183 |
| 2022/0389981 A1* | 12/2022 | Leiter ..................... F16D 65/18 |

\* cited by examiner

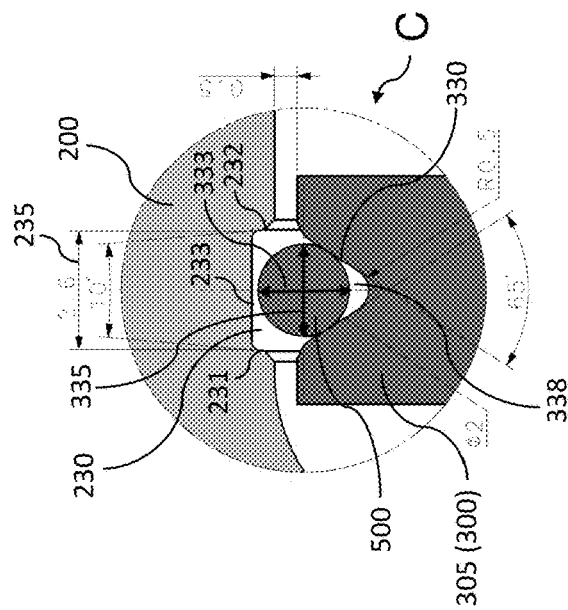
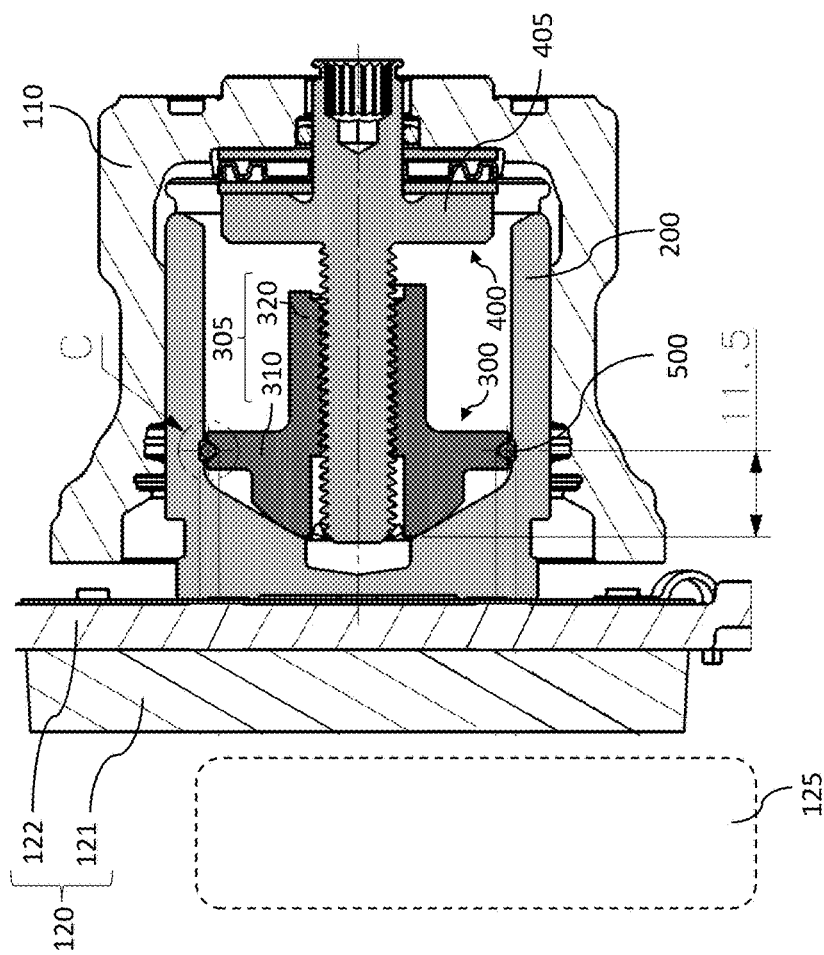
FIG. 3B
FIG. 3A

BRAKE ASSEMBLY WITH ACTIVE PISTON RETRACTION

BACKGROUND

Various embodiments of the present disclosure generally relate to brake assemblies for a vehicle and more particularly to a brake assembly having an improved structure for retracting a brake piston during a release operation of an electric parking brake.

Generally, a brake assembly may include a service brake assembly and a parking brake assembly. The service brake assembly may have a rotor, a brake caliper, and brake pads on opposing sides of the rotor. The brake caliper is slidably supported on pins secured to an anchor bracket fixed to a non-rotatable component of a vehicle, and includes one or more piston bores, each of which houses a piston that is movable along a piston axis during a brake apply and release of the brake apply. The brake pads are connected to one or more hydraulically or pneumatically actuated pistons for movement between a non-braking position and a braking position where the brake pads are moved into frictional engagement with the opposed braking surfaces of the rotor. For example, when an operation of the vehicle depresses a brake pedal, brake fluid can move the piston into contact with one brake pad and then move one brake pad into contact with one side of the rotor, while another opposing brake pad is moved into contact with an opposing side of the rotor.

When a vehicle is stopped or parked, the parking brake assembly may be used to prevent movement of the vehicle. The parking brake assembly may be a discrete assembly, or may utilize one or more components of the service brake assembly. That is, the parking brake assembly may use the piston and the brake pads of the service brake assembly to create the brake apply. For example, the parking brake assembly may move the piston, which may move the brake pads into contact with the rotor to create and maintain a brake apply by clamping force applied to the rotor.

It is with respect to these and other general considerations that the following embodiments have been described. Also, although relatively specific problems have been discussed, it should be understood that the embodiments should not be limited to solving the specific problems identified in the background.

SUMMARY

The features and advantages of the present disclosure will be more readily understood and apparent from the following detailed description, which should be read in conjunction with the accompanying drawings, and from the claims which are appended to the end of the detailed description.

According to various embodiments of the present disclosure, a brake assembly may comprise: a brake piston configured to be movable for a brake apply or release, the brake piston having an inner wall forming a piston cavity, wherein a groove is formed on the inner wall of the brake piston; a linearly movable structure positioned within the piston cavity of the brake piston, the linearly movable structure configured to be linearly movable within the piston cavity in response to rotation of a rotatable structure operably coupled to the linearly movable structure; and a resilient material, wherein at least a part of the resilient material is located within the groove formed on the inner wall of the brake piston and an other part of the resilient material is disposed on an outer surface of the linearly movable structure positioned within the piston cavity of the brake piston so that the resilient material is engageable with a surface of the groove formed on the inner wall of the brake piston to move the brake piston by a restoring force of the resilient material in response to linear movement of the linearly movable structure.

According to some embodiments of the present disclosure, a brake assembly may comprise: a caliper having a caliper cavity; a brake pad coupled to the caliper; a brake piston mounted in the caliper cavity and configured to be movable to displace the brake pad for a brake apply or release, the brake piston having an inner wall forming a piston cavity, wherein a groove is formed on the inner wall of the brake piston; a spindle nut positioned within the piston cavity of the brake piston, the spindle nut configured to be linearly movable within the piston cavity in response to rotation of a spindle; the spindle operably coupled to the spindle nut; and a resilient material, wherein at least a part of the resilient material is located within the groove formed on the inner wall of the brake piston and an other part of the resilient material is disposed on an outer surface of the spindle nut positioned within the piston cavity of the brake piston so that the resilient material is engageable with a surface of the groove formed on the inner wall of the brake piston to move the brake piston by a restoring force of the resilient material in response to linear movement of the spindle nut.

For example, die linearly movable structure positioned within the inner wall of the brake piston may be a spindle nut, and the rotatable structure operably coupled to the linearly movable structure may be a spindle.

The resilient material fixed to the outer surface of the linearly movable structure may be configured to be at least partially deformable in an area of contact with the surface of the groove formed on the inner wall of die brake piston and move the brake piston by the restoring force of the resilient material against the surface of the groove formed on the inner wall of the brake piston.

The resilient material disposed on the outer surface of the linearly movable structure may be configured to retract the brake piston during the brake release.

The other part of the resilient material may be disposed in another groove formed on the outer surface of the linearly movable structure, and the at least part of the resilient material may be positioned within the groove formed on the inner wall of the brake piston.

The linearly movable structure may comprise a head portion configured to contact the brake piston during the brake apply, and a body portion extended from the head portion of the linearly movable structure. An outer diameter of the head portion of the linearly movable structure may be larger than an outer diameter of the body portion of the linearly movable structure, and the resilient material may be mounted to the head portion of the linearly movable structure.

One or more holes may be formed at the head portion of the linearly movable structure.

The resilient material may be mounted to a portion of the linearly movable structure where an outer diameter of the linearly movable structure is largest.

The resilient material may have a shape of an O-ring. Alternatively, the resilient material may have a shape of a polygonal ring.

The groove formed on the inner wall of the brake piston may have a space that the resilient material is movable therein.

This Summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Various embodiments in accordance with the present disclosure will be described with reference to the drawings, in which:

FIG. 3A is a cross-sectional view of a brake assembly taken at cross-section B-B of FIG. 1 according to the first exemplary embodiment of the present disclosure.

FIG. 3B is an enlarged view of an encircled portion C shown in FIG. 3A according to the first exemplary embodiment of the present disclosure.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF EMBODIMENTS

Figure 1:
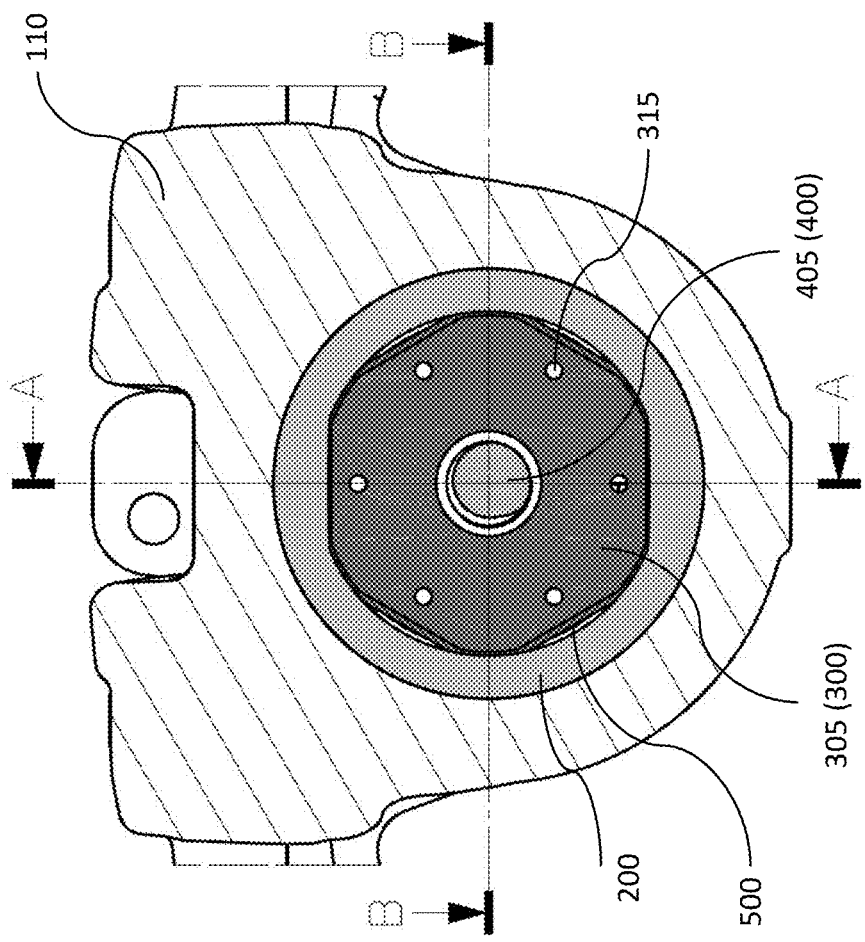
FIG. 1 illustrates a cross-sectional view of a brake assembly according to a first exemplary embodiment of the present disclosure.
Figure 2:
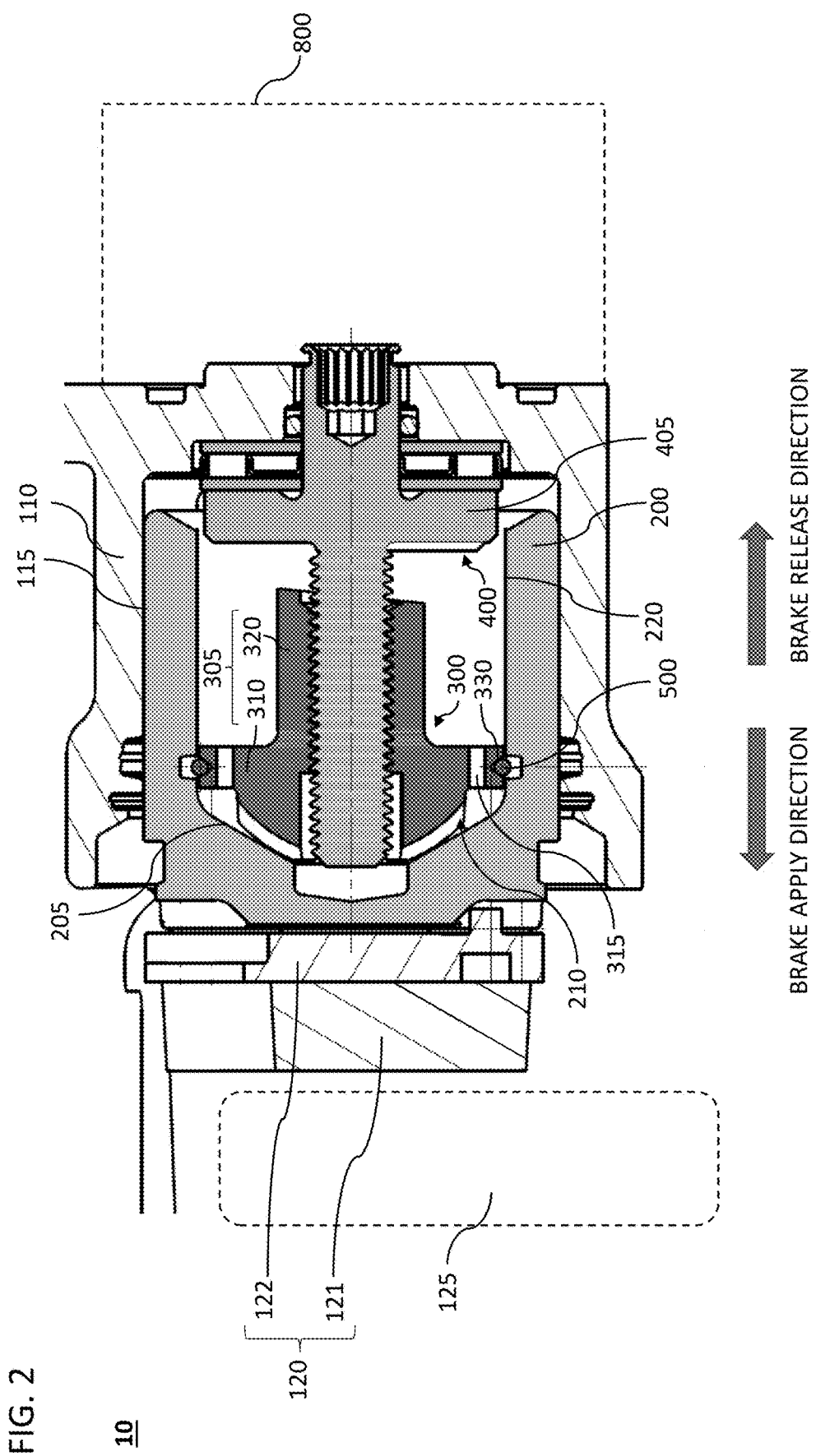
FIG. 2 shows a cross-sectional view of a brake assembly taken at cross-section A-A of FIG. 1 according to the first exemplary embodiment of the present disclosure.
Figure 4:
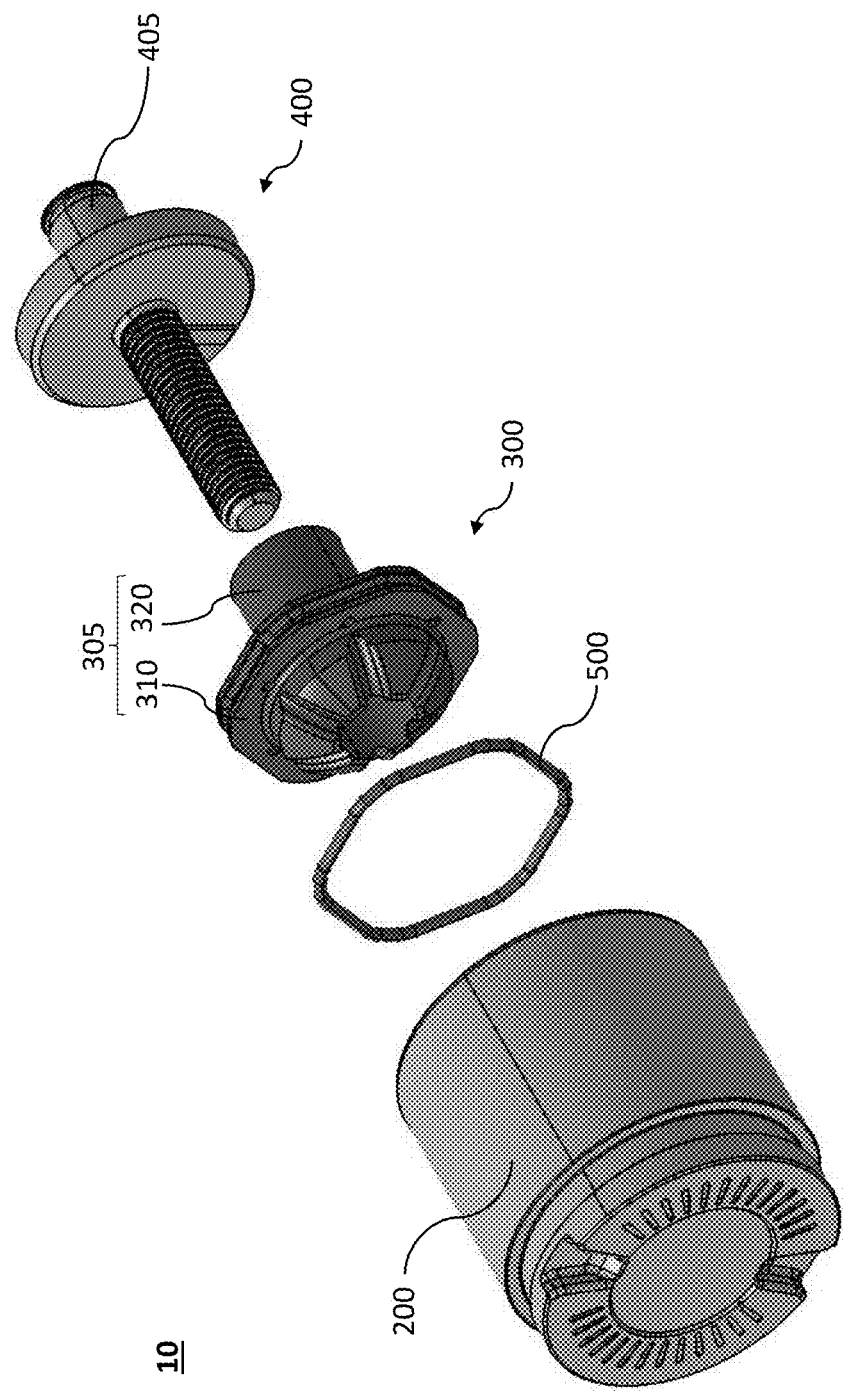
FIG. 4 is an exploded view of a brake assembly according to the first exemplary embodiment of the present disclosure.
Figure 5:
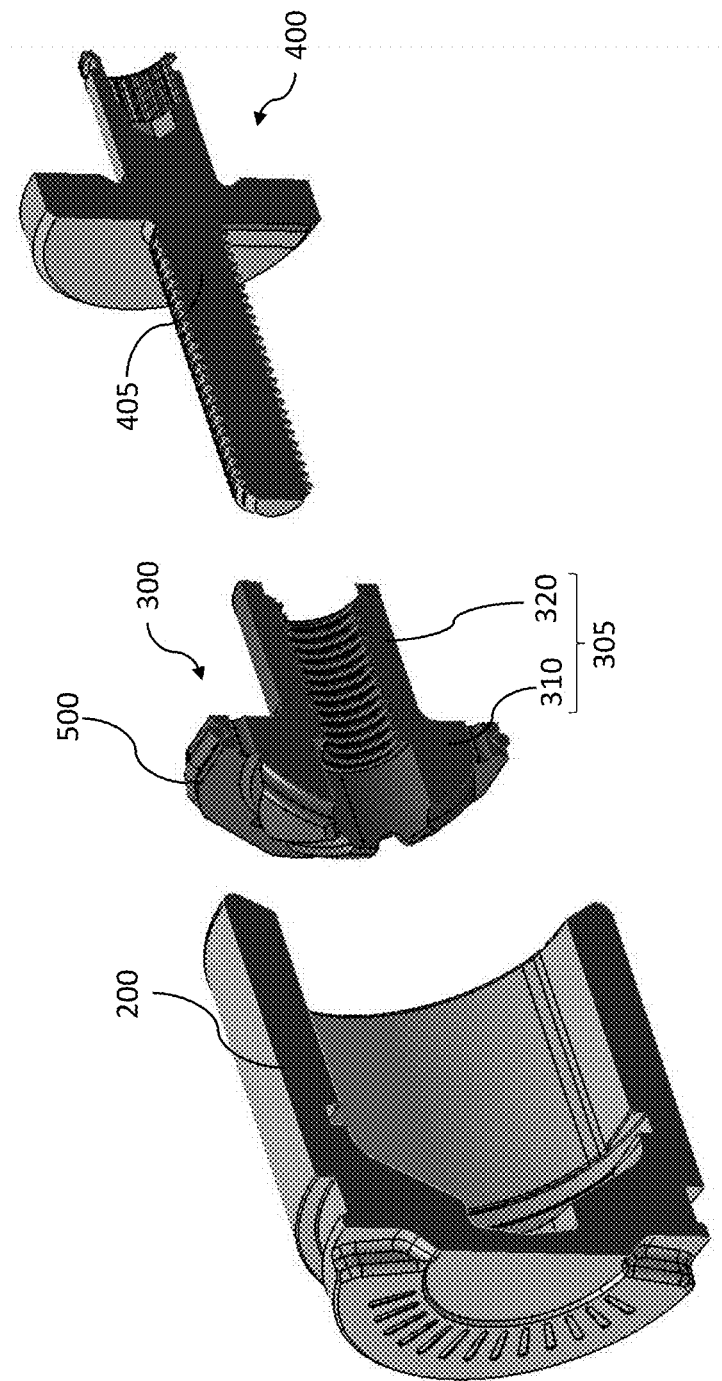
FIG. 5 is a cross-sectional and exploded view of a brake assembly according to the first exemplary embodiment of the present disclosure.

In the following detailed description, reference is made to the accompanying drawings which form a part of the present disclosure, and in which are shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the invention. The following detailed description is therefore not to be taken in a limiting sense, and the scope of the invention is defined only by the appended claims and equivalents thereof. Like numbers in the figures refer to like components, which should be apparent from the context of use.

FIGS. 1 to 7B illustrate a brake assembly according to a first exemplary embodiment of the present disclosure.

Referring to FIGS. 1 to 5, a brake assembly 10 may include a brake caliper 110. The brake caliper 110 may be mounted in a floating manner by means of a brake carrier. A brake pad assembly or brake lining assembly 120 is provided in the brake caliper 110, and includes a brake pad or lining 121 and a brake pad or lining carrier 122. The brake caliper 110 may include a bridge with fingers, and the fingers of the brake caliper 110 may be in contact with the brake pad carrier 122. The brake pad 121 is disposed with a small air clearance on a side of a brake rotor 125, such as a brake disc, in a release position so that no significant residual drag moment occurs. The brake pad carrier 122 is disposed between the brake pad 121 and a brake piston 200, the brake pad 121 and the brake pad carrier 122 move jointly together, and the movement of the brake pad carrier 122 causes the brake pad 121 to move with respect to the brake rotor 125. When a vehicle is in motion, the brake rotor 125 may rotate with a wheel about an axle of a vehicle. The brake caliper 110 may be connected to any non-rotating or non-moving part of a vehicle.

The brake piston 200 is mounted in a movable manner in a caliper cavity or bore 115 defined in the brake caliper 110. The caliper bore 115 can support the brake piston 200 therein. The brake piston 200 may be moved in a brake apply direction, which may function to move the brake pad 121, towards the brake rotor 125 to create the clamping force. The brake piston 200 may be moved in a brake release direction, which may function to allow the brake pad 121 to move away from the brake rotor 125 to release the clamping force.

A linearly movable structure 300 may be received in the piston cavity 210 formed by the inner wall of the brake piston 200. The linearly movable structure 300 may be configured to be linearly movable within the piston cavity 210 formed by the inner wall of the brake piston 200. For example, the linearly movable structure 300 may be operable coupled with a rotatable structure 400, and the linearly movable structure 300 is linearly movable in response to rotation of the rotatable structure 400. The linearly movable structure 300 and the rotatable structure 400 may be configured to transfer a power output from an actuator assembly 800 into a linear or axial force to move the brake piston 200 along an axis of the caliper cavity 115. The actuator assembly 800 may include, for example, but not limited to, one or more of a motor and one or more gears and/or belts for increasing a torque output of the motor, In an exemplary embodiment of the present disclosure, the linearly movable structure 300 may include a spindle nut 305, and the rotatable structure 400 may comprise a spindle 405. The linearly movable structure 300 and the rotatable structure 400 may be operatable coupled by a threaded portion, a ball screw, a roller screw, a ball ramp, or any coupling structure or mechanism that can change the rotation movement to the linear movement.

The actuation of the actuator assembly 800 causes the spindle 405 to rotate and then the rotation of the spindle 405 causes the spindle nut 305 to be linearly moved. The motor of the actuator assembly 800 may be directly coupled to an end of the spindle 405. Alternatively, the motor of the actuator assembly 800 may be indirectly and operably coupled to the spindle 405 via one or more torque transferring mechanisms, such as gears, gear trains, and belts.

The spindle nut 305 can move axially either towards or away from the brake rotor 125. The direction that the spindle nut 305 is moved depends on the direction that the spindle 405 rotates. During a parking brake apply, the spindle 405 is rotated in an apply direction so that the spindle nut 305 is moved in a direction towards the brake rotor 125. During a parking brake release, the spindle 405 is rotated in an opposing release direction so that the spindle nut 305 is moved in a direction away from the brake rotor 125.

The spindle nut 305 has a head portion 310 which has a conical shape and can be brought into contact with a complementarily conical inner surface 205 of the brake piston 200. In a release position, there is a clearance between the head portion 310 of the spindle nut 305 and the conical inner surface 205 of the brake piston 200. The head portion 310 of the spindle nut 305 may have one or more holes 315 configured to allow hydraulic fluid to pass therethrough. The spindle nut 305 further comprises a body portion 320 extended from the head portion 310 of the spindle nut 305. An outer diameter of the head portion 310 of the spindle nut 305 may be larger than an outer diameter of the body portion 320 of the spindle nut 305.

The spindle nut 305 may threadably engage the spindle 405. For example, an outer surface of the spindle 405 may have a threaded portion and an inner surface of the spindle nut 305 may have a threaded portion that is configured to threadably engage the threaded portion of the spindle 405. Alternatively, the spindle nut 305 and the spindle 405 may be coupled to each other via a ball screw or nut, a roller screw, a ball ramp, or any rotary to linear mechanism configured to convert a rotary movement into a linear movement.

The rotation of the spindle 405 causes the spindle nut 305 to move linearly. The spindle nut 305 is restricted or prevented from rotating about an axis of the spindle 405, or about the spindle itself. As illustrated in FIG. 1, the spindle nut 305 is keyed to the piston cavity 210 of the brake piston 200 to prevent the spindle nut 305 from rotating about the spindle 405 or spindle axis.

When service braking is performed, the brake assembly 10 is hydraulically actuated. For example, the brake assembly 10 may be hydraulically actuated by a driver via a brake pedal or via a drive assistance system. When the brake assembly 10 is hydraulically actuated, hydraulic fluid is pressurized in the piston cavity 210 such that the brake piston 200 is displaced in a direction toward the brake rotor 125, and the brake pad 121 is pressed onto the brake rotor 125 by means of the brake caliper 110. However, the spindle nut 300 remains unactuated, and therefore remains at an initial axial position. During the service braking application, the fluid may be pressurized, which may function to exert a fluid pressure force or a pressing force on the brake piston 200. The fluid pressure force or the pressing force may move the brake piston 200 in the apply direction towards the brake pad 121. The pressurized fluid pressure or the pressing force applied on the brake piston 200 in turn exerts a force onto the brake pad carrier 122.

Operation of parking brake of the brake assembly 10 will now be described. It is understood that these operations or method steps can be performed in virtually any order, and one or more of the operations or steps described herein may be changed, combined, omitted or repeated.

For activating parking brake, a signal may be transmitted by an electronic control unit (ECU) or a controller to the actuator assembly 800 to apply the parking brake. In response to the signal of the ECU, the actuator assembly 800 provides torque to the spindle 405 in the brake apply direction so that the rotation force provided by the actuator assembly 800 can cause the spindle 405 to rotate in the apply direction and then the rotation of the spindle 405 can cause the spindle nut 305 to be advanced or linearly moved in a direction toward the brake rotor 125 and then the head portion 310 of the spindle nut 300 to contact and support the inner wall of the brake piston 200 (e.g. the conical inner surface 205) until the clearance between the brake pad 121 and the brake rotor 125 is removed. The continued rotation of the spindle 405 and thus linear movement of the spindle nut 305 to move the brake piston 200 and the brake pad 121 against the brake rotor 125 to generate the clamping force necessary to prevent movement of the vehicle.

Eventually, a forward or leading end of the spindle nut 305 may contact an end inner wall of the piston cavity 210. After the contact is made between the forward or leading end of the spindle nut 305 and the end inner wall of the piston cavity 210, continued rotation of the spindle 405 in the apply direction, and thus continued linear movement of the spindle nut 305 in the apply direction, causes the brake piston 200 to be pushed or moved in the apply direction towards the brake pad 121. Continued movement of the brake piston in the apply direction eventually causes the brake piston 200 to move or push the brake pad 121 against the brake rotor 125 to create friction or a clamping force.

As a result, the position of the brake piston 200 is fixed in a parking brake state by the support of the spindle nut 305. Once the brake piston 200 is supported by the spindle nut 305, the hydraulic pressure in the piston cavity 210 may be removed. The parking brake state is maintained by the spindle nut 300 because of self-locking between the spindle nut 300 and the spindle 400. The brake pad 121 pressing against the brake rotor 125 is supported via the spindle nut 300.

To release the parking brake, the ECU or controller may transmit a signal for the parking brake release to the actuator assembly 800. In response to the signal for the parking brake release, the actuator assembly 800 provides rotation force to the spindle 405 in an opposing direction or brake release direction, which is opposite to the direction that the spindle is rotated when the spindle is rotated in the apply direction, which causes the spindle 405 to rotate in the opposing direction or brake release direction and then the spindle nut 305 to move axially in the brake release direction or a direction away from the brake rotor 125. The linear movement of the spindle nut 305 in the brake release direction may make the brake piston 200 free to relax and move away from the brake pad 121 so that the brake pad 121 can move away from the brake rotor 125 to release the clamping force.

When the parking brake state is released, pressurized hydraulic fluid is introduced into the brake cavity 210. As a result, the brake piston 200 is displaced slightly toward the brake rotor 125 such that the spindle nut 305 can be relieved of axial load. Through the control of the actuator assembly 800, the spindle nut 305 can be retracted in a direction away from the brake rotor 125 into the initial position.

The rotation of the spindle 405 in the release direction causes the spindle nut 305 to move linearly or axially in the release direction, or away from the end inner wall 205 of the brake piston 200. The brake piston 200 can then move back into the caliper cavity 115 out of contact with the brake carrier 122, thus allowing the brake pad 121 to move out of contact with the brake rotor 125 to release the clamping force.

A resilient material 500 may be located between an inner wall 220 of the brake piston 200 and an outer surface of the linearly movable structure 300 (e.g. the spindle nut 305) to retract the brake piston 200 during the brake release.

The resilient material 500 may be fixed to the outer surface of the linearly movable structure 300. For example, as illustrated in FIG. 3B, a part of the resilient material 500 is disposed in a groove 330 formed on the outer surface of the spindle nut 305. The groove 330 of the spindle nut 305 may be formed at the flange part included in the head portion 310 of the spindle nut 305 such that the resilient material 500 can be mounted to the head portion 310 of the spindle nut 305. The resilient material 500 may be mounted to a portion of the linearly movable structure 300 where an outer diameter of the linearly movable structure 300 is largest in order to be positioned close to the inner wall 220 of the brake piston 200 so that at least a part of the resilient material 500 can be inserted in a groove 230 of the brake piston 200.

The groove 330 of the spindle nut 305 may have a V-shape formed by two inner walls of the groove 330 of the spindle nut 305. An angle between two inner walls forming the groove 330 of the spindle nut 305 may be 60° to 70° for providing a clearance 338 between the resilient material 500 and the groove 330 of the spindle nut 305 in a state that the resilient material 500 is not compressed by the wall of the groove 230 of the brake piston 200. When the resilient material 500 is compressed by the wall of the groove 230 of the brake piston 200 the deformed part of the resilient material 500 can be filled into the clearance 338. However, the groove 330 of the spindle nut 305 may have any shape, for example, but not limited to, a U-shape, a square, a half circle or oval, a polygon, or any shape that can receive the resilient material 500.

The resilient material 500 may be any material that is capable of being deformed and returning to the original shape or form after being compressed or bent. For example, the resilient material 500 may be rubber (e.g. Ethylene Propylene Diene Monomer (EPDM), Butadiene rubber (BR), Butyl rubber (IIR), and Ethylene propylene rubber (EPR), Nitrile rubber (NBR, HNBR, USN, Buna-N), Polyacrylate rubber (ACM), Styrene-butadiene rubber (SBR), and Polysulfide rubber (PSR)), a polymeric material, Fluoroelastomer (FKM), Perfluoroelastomer (FFKM), Polychloroprene (CR), Polyisoprene (IR), Polytetrafluoroethylene (PTFE), Sanifluor, Thermoplastic elastomer (TPE) styrenics, and Thermoplastic polyurethane (TPU) polyether, polyester. According to some exemplary embodiments of the present disclosure, the cross-sectional shape of the resilient material 500 is circular, but the resilient material 500 may have an X-shaped, Q-shaped, square-shaped (such as square-cuts, lathe cuts, tabular cut or square rings), or polygon-shaped cross-section and a combination thereof.

At least a part of the resilient material 500 is located within the groove 230 formed on the inner wall 220 of the brake piston 200. The groove 230 of the brake piston 200 may have a space that the resilient material 500 can move therein, although not required. For example, as shown in FIG. 3B, a width 235 of the groove 230 of the brake piston 200 may be larger than a width or radius 335 of the resilient material 500 so that the resilient material 500 can move within the groove 230 of the brake piston 200. A height 333 of the resilient material 500 may be tall enough so that at least a part of the resilient material 500 is located within the groove 230 of the brake piston 200 and is able to contact the wall of the groove 230 of the brake piston 200 (e.g. first and second side walls 231, 232 of the groove 230) depending on the linear movement of the spindle nut 305 having the resilient material 500 with respect to the brake piston 200. However, the resilient material 500 may not contact the top surface 233 of the groove 230 of the brake piston 200. An angle between the first and second side walls 231 and 232 of the groove 230 of the brake piston 200 may be 5° to 15° to provide smooth and efficient retraction of the brake piston 200 in association with the resilient material 500. Although certain exemplary embodiments the present disclosure illustrates that the shape of the groove 230 of the brake piston 200 is generally squared, the groove 230 of the brake piston 200 may have any shape, for instance, but not limited to, a shape be generally circular in shape, generally oval in shape, the generally triangular in shape, a combination thereof, or the like, when viewed as a cross section. And, the edge of the groove 230 of the brake piston 200 may be curved or has a tilted surface to smoothly interact with the resilient material 500.

Figure 6B:
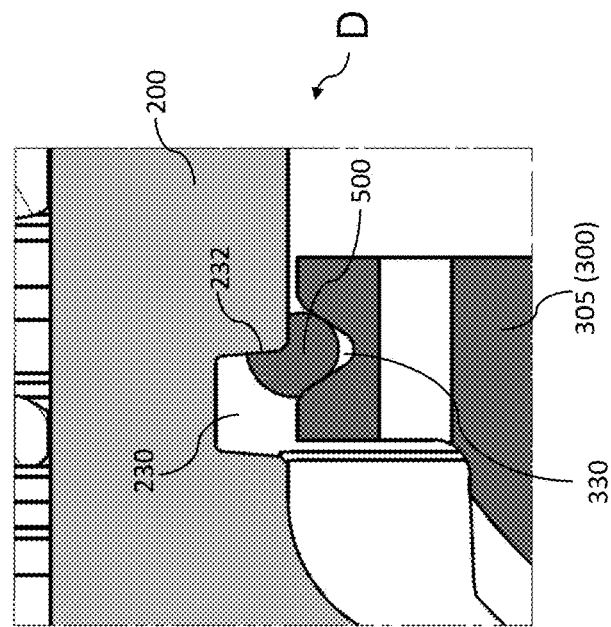
FIG. 6B is an enlarged view of an area D shown in FIG. 6A.
Figure 6A:
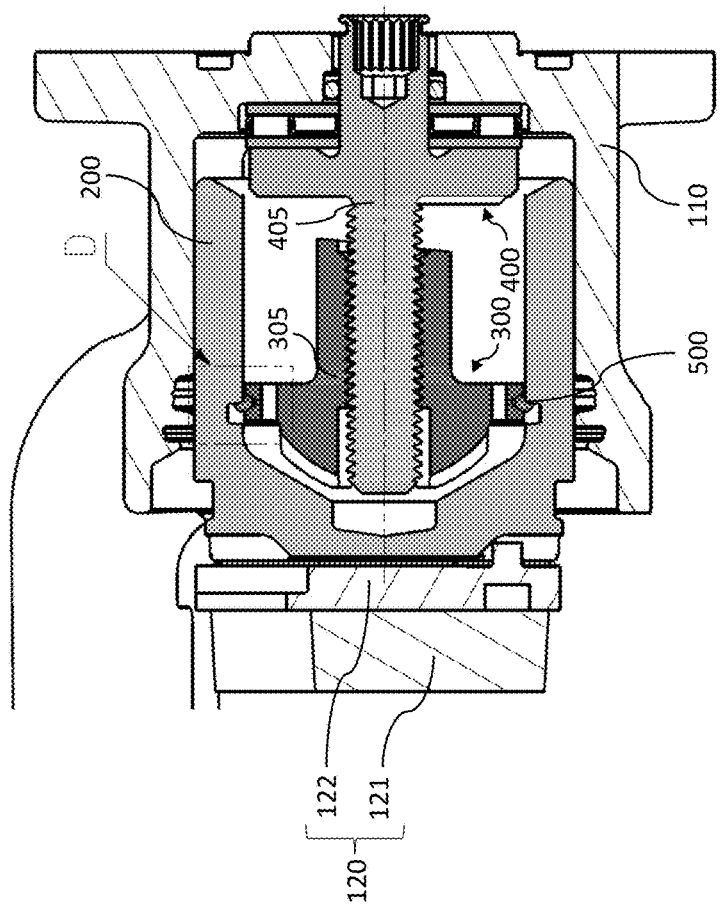
FIG. 6A is a cross-sectional view of illustrating an exemplary status of a brake assembly in which a resilient material mounted to a linearly movable structure is compressed by an inner wall of a groove of a brake piston during a brake release operation according to the first exemplary embodiment of the present disclosure.
Figure 7B:
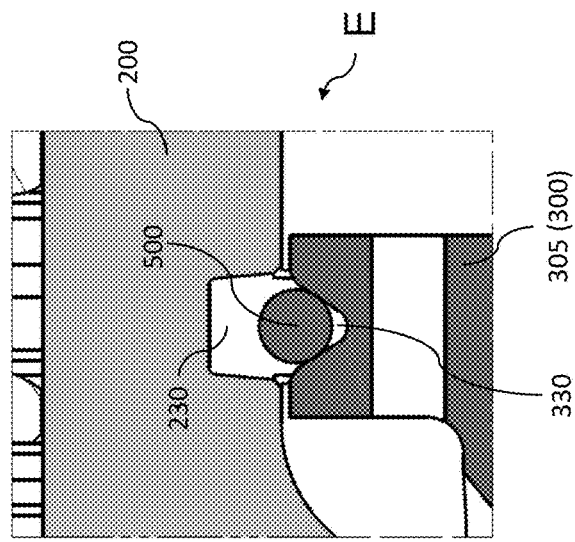
FIG. 7B is an enlarged view of an area E shown in FIG. 7A.
Figure 7A:
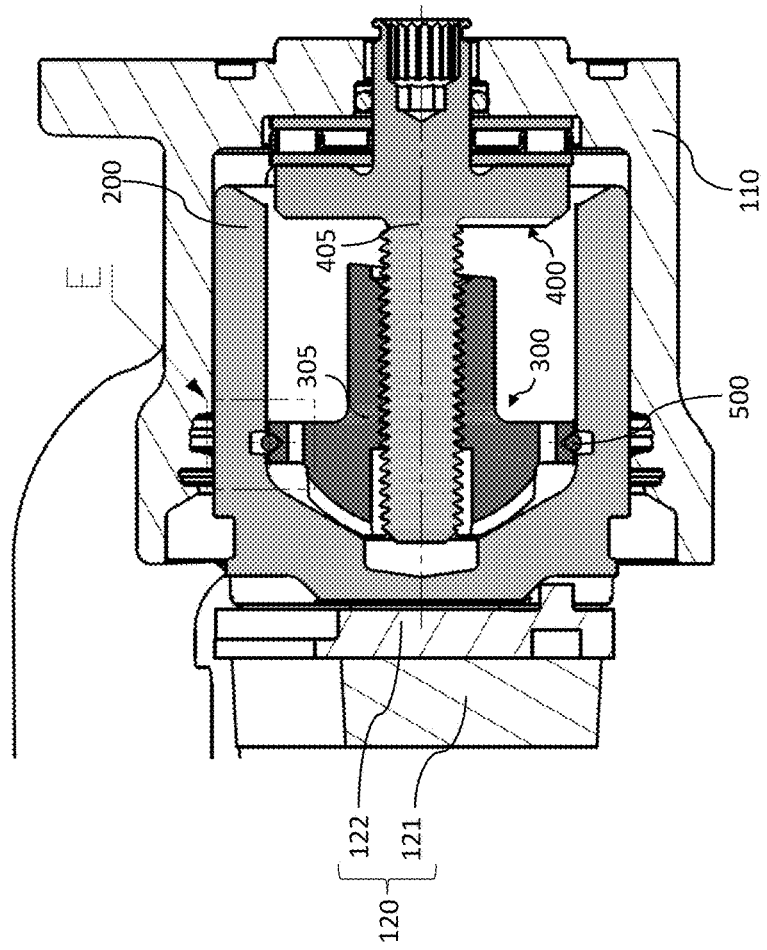
FIG. 7A is a cross-sectional view of illustrating an exemplary status of a brake assembly in which a brake piston is retracted by a restoring force of a resilient material mounted to a linearly movable structure during a brake release operation according to the first exemplary embodiment of the present disclosure.

The resilient material 500 fixed to the outer surface of the linearly movable structure 300 (e.g. the spindle nut 305) is configured to be at least partially deformable in an area of contact with the surface of the groove 230 formed OR the inner wall of the brake piston 200 as illustrated in FIGS. 6A and 6B, and then retract the brake piston 200 by the restoring force of the resilient material 500 against the surface of the groove 230 formed on the inner wall of the brake piston 230 as shown in FIGS. 7A and 7B.

In operation, when the parking brake is in the brake apply position, the brake piston 200 is pushed by the linearly movable structure 300 (e.g. the spindle nut 305) and is in direct or indirect contact with the brake pad assembly 120 to maintain the clamping force of the brake pad assembly 120 against the brake rotor 125. However, when the parking brake is released, the spindle nut 305 is retracted in a brake release direction away from brake rotor 125 in response to the rotation of the spindle 405, and the retraction of the spindle nut 305 causes the resilient material 500 to be deformed or squeezed as illustrated in FIGS. 6A and 6B. Then, the deformed resilient material 500 exerts a restoring force against at least one of the second side wall 232 of the groove 230 of the brake piston 230 and/or the inner surface of the brake piston 230, thereby pushing the brake piston 230 away from the brake rotor 125, and therefore the brake piston 230 can be retracted together with the linearly movable structure 300 (e.g. the spindle nut 305) by the resilient material 500 as shown in FIGS. 7A and 7B. Accordingly, upon brake release, the brake piston 230 is forced back and retracted by the restoration force of the resilient material 500. Accordingly, the resilient material 500 advantageously assists in retracting the brake piston 230 to pull the brake piston to a pre-apply position and maintain a constant and repeatable air gap between the brake piston 230 and the brake rotor 125. The resilient material 500 can retract the brake piston 230 actively when the spindle nut 305 is retracted. The brake drag caused by contact forces between the brake pad assembly 120 and the brake rotor 125 due to insufficient retraction distance of the brake piston 230 during the brake release operation can be prevented, and therefore the brake piston retraction is improved.

Figure 8:
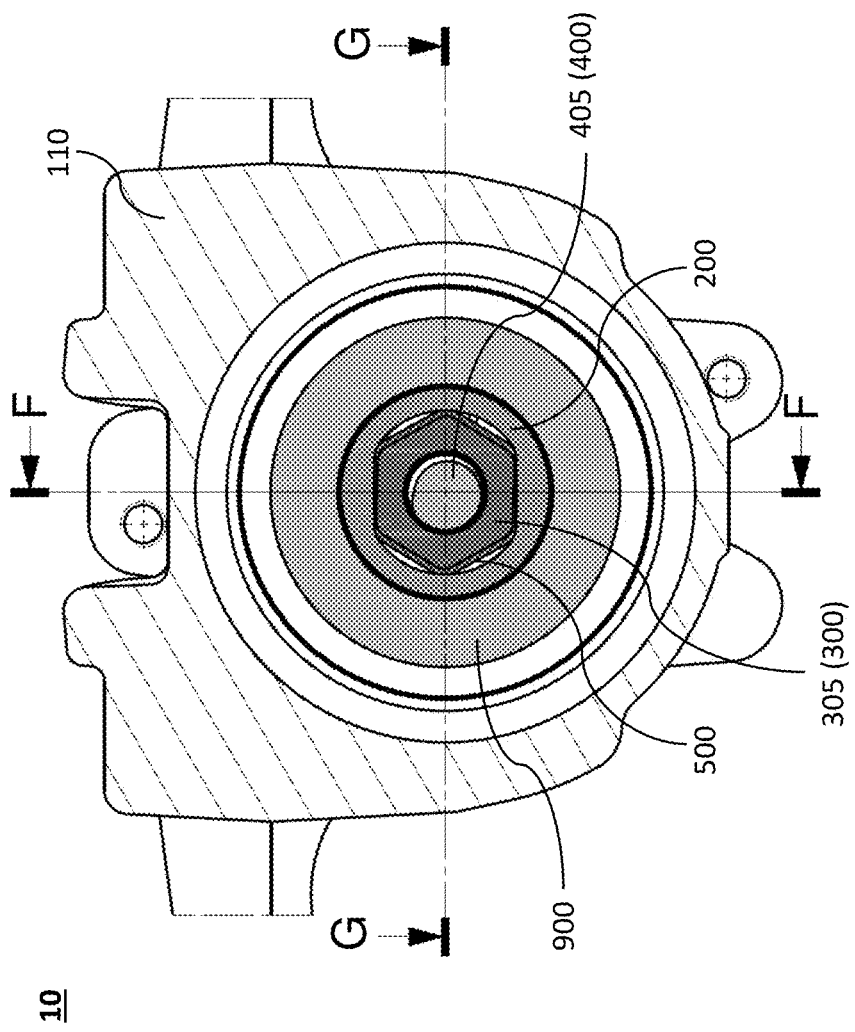
FIG. 8 illustrates a cross-sectional view of a brake assembly according to a second exemplary embodiment of the present disclosure.
Figure 9:
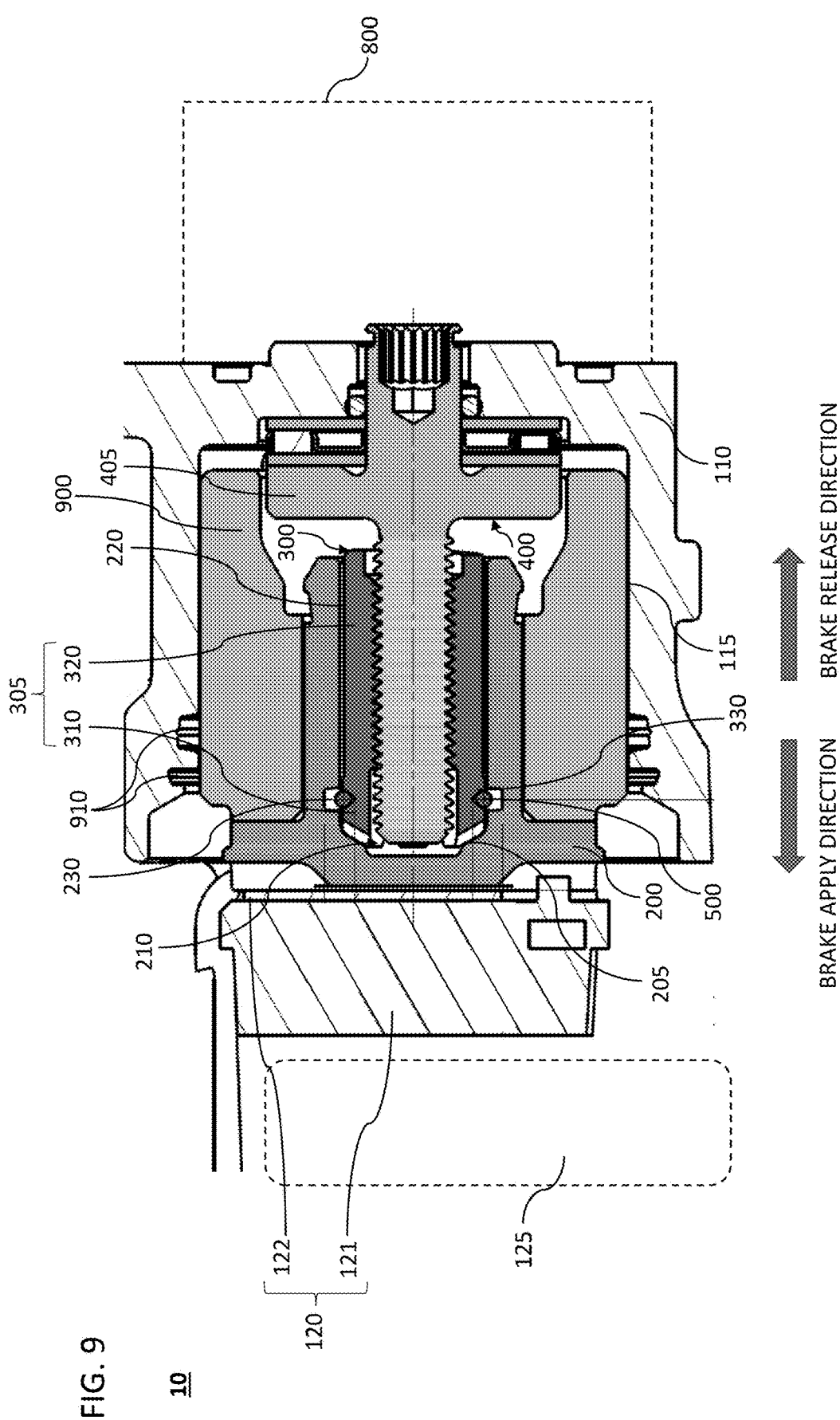
FIG. 9 shows a cross-sectional view of a brake assembly taken at cross-section F-F of FIG. 8 according to the second exemplary embodiment of the present disclosure.
Figure 10B:
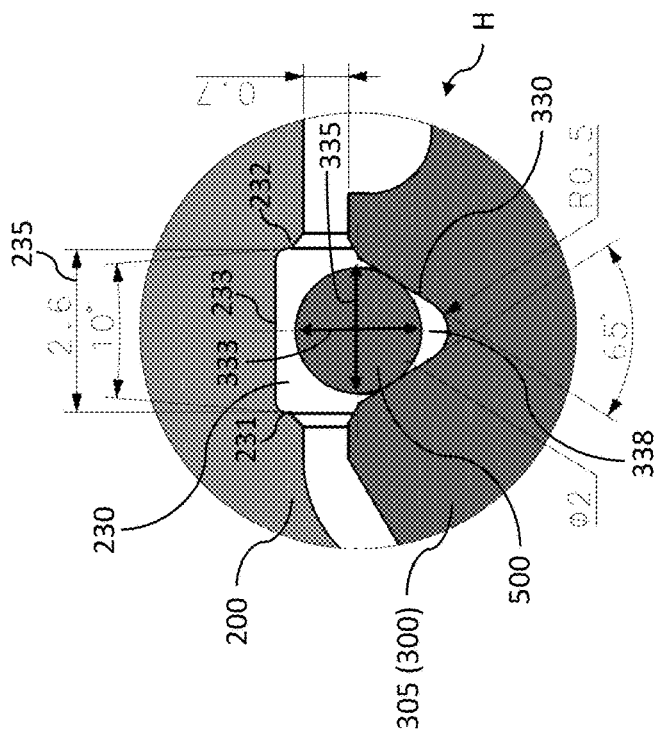
FIG. 10B is an enlarged view of an encircled portion H shown in FIG. 10A according to the second exemplary embodiment of the present disclosure.
Figure 10A:
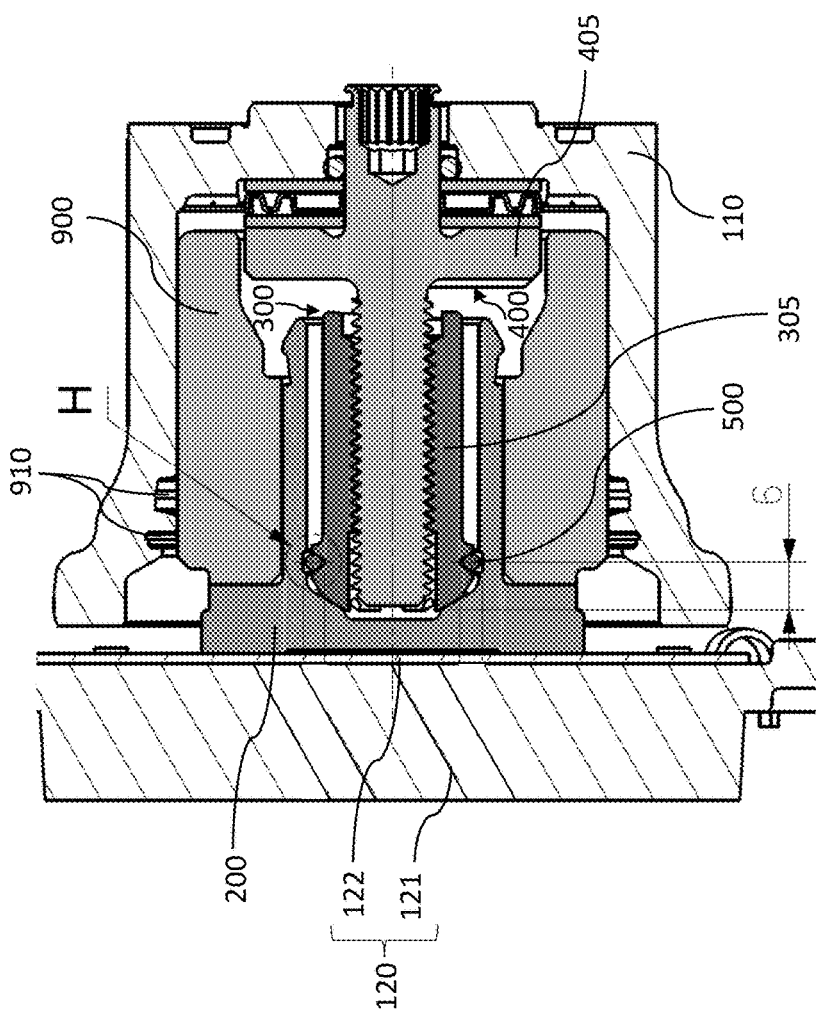
FIG. 10A is a cross-sectional view of a brake assembly taken at cross-section G-G of FIG. 8 according to the second exemplary embodiment of the present disclosure.
Figure 11:
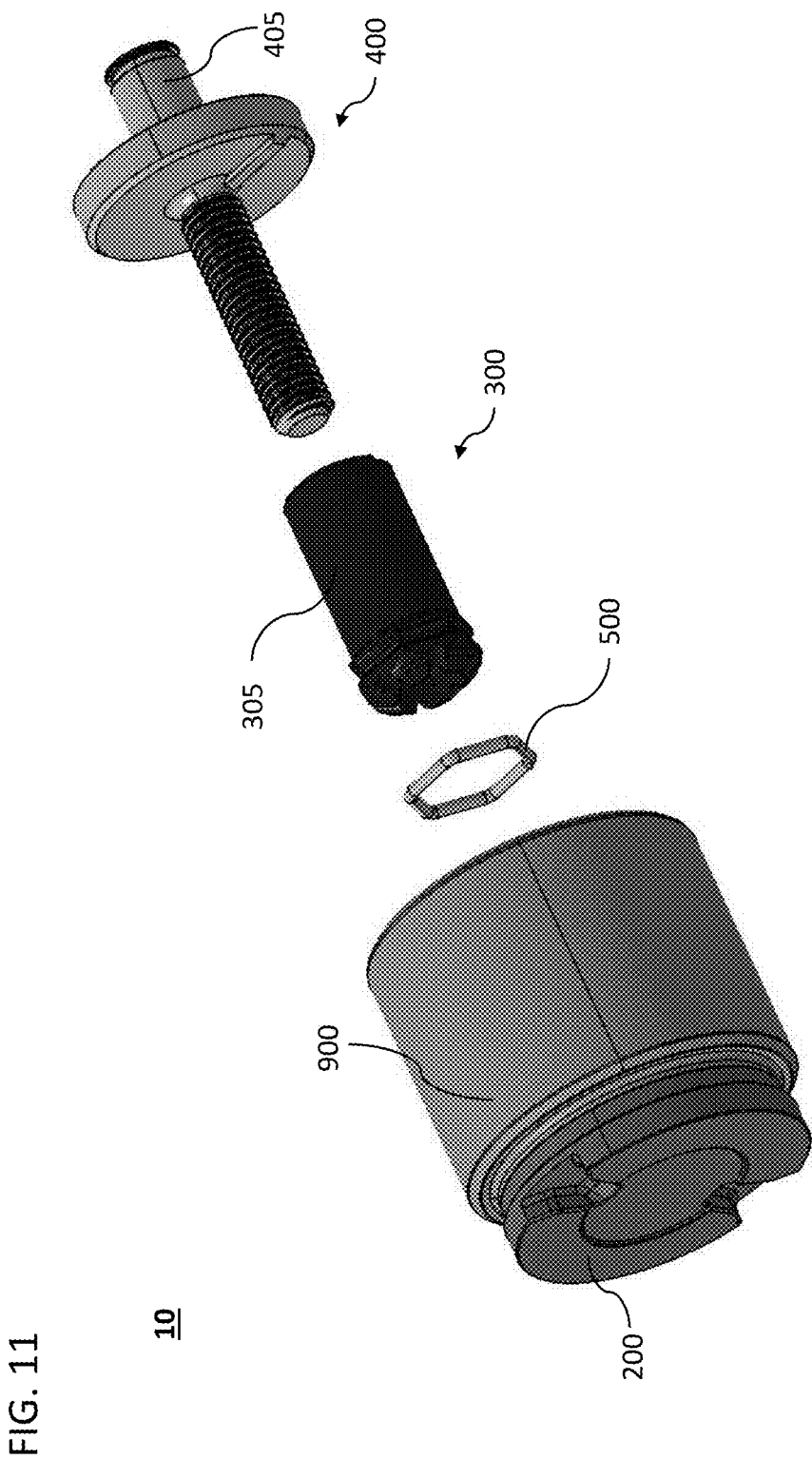
FIG. 11 is an exploded view of a brake assembly according to the second exemplary embodiment of the present disclosure.
Figure 12:
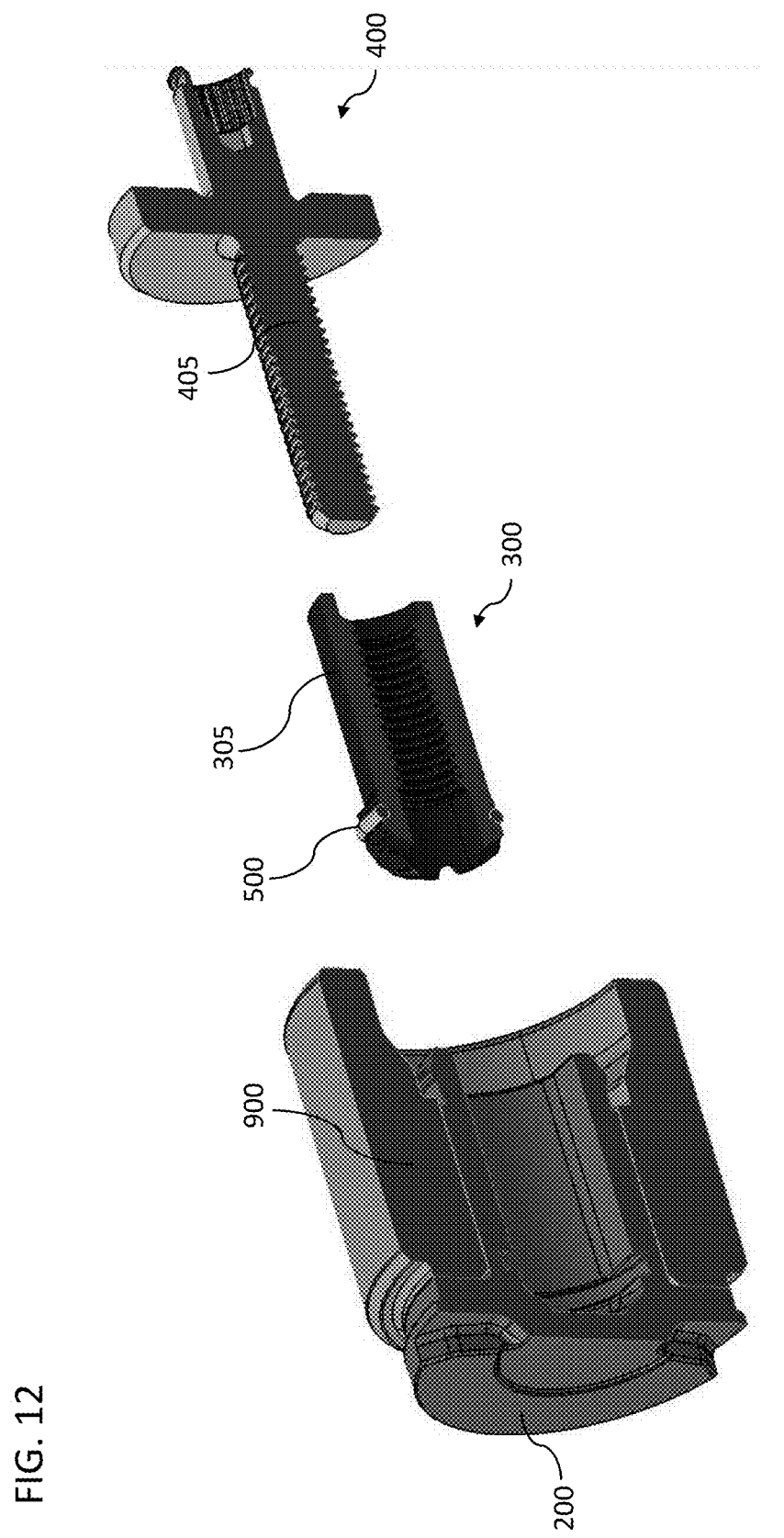
FIG. 12 is a cross-sectional and exploded view of a brake assembly according to the second exemplary embodiment of the present disclosure.
Figure 13B:
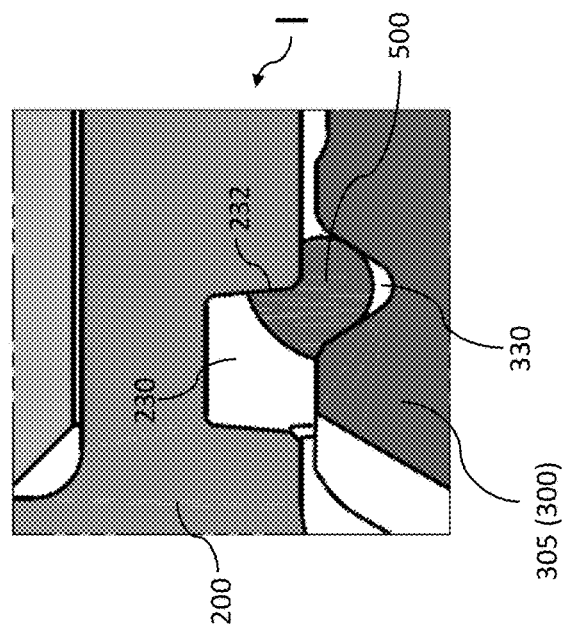
FIG. 13B is an enlarged view of an area I shown in FIG. 13A.
Figure 13A:
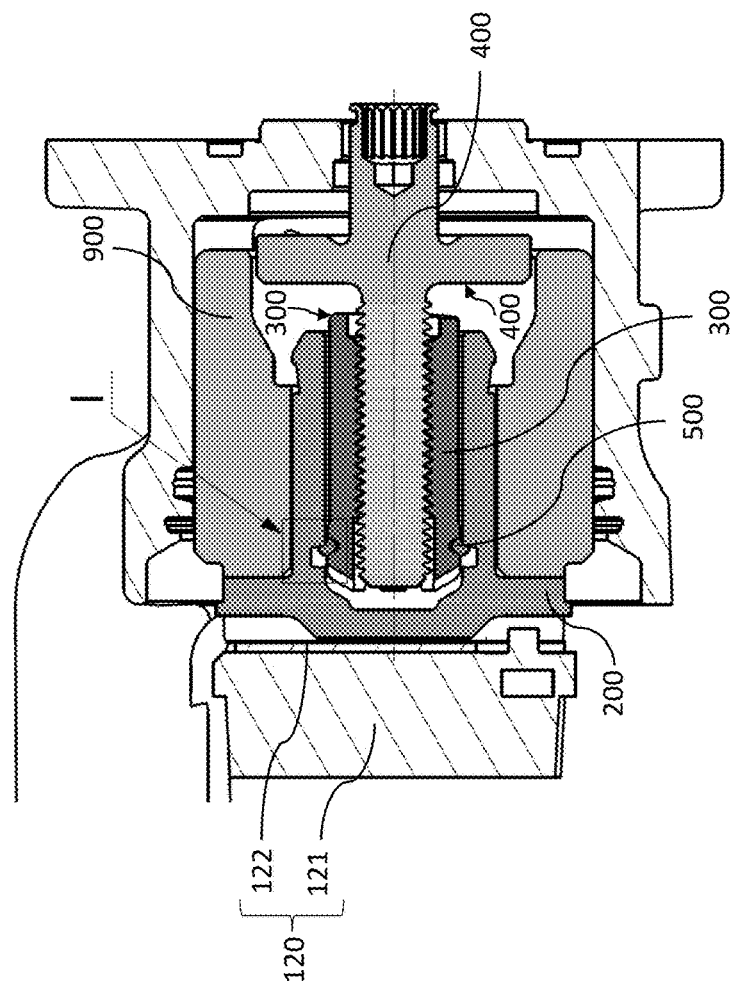
FIG. 13A is a cross-sectional view of illustrating an exemplary status of a brake assembly in which a resilient material mounted to a linearly movable structure is compressed by an inner wall of a groove of a brake piston during a brake release operation according to the second exemplary embodiment of the present disclosure.
Figure 14B:
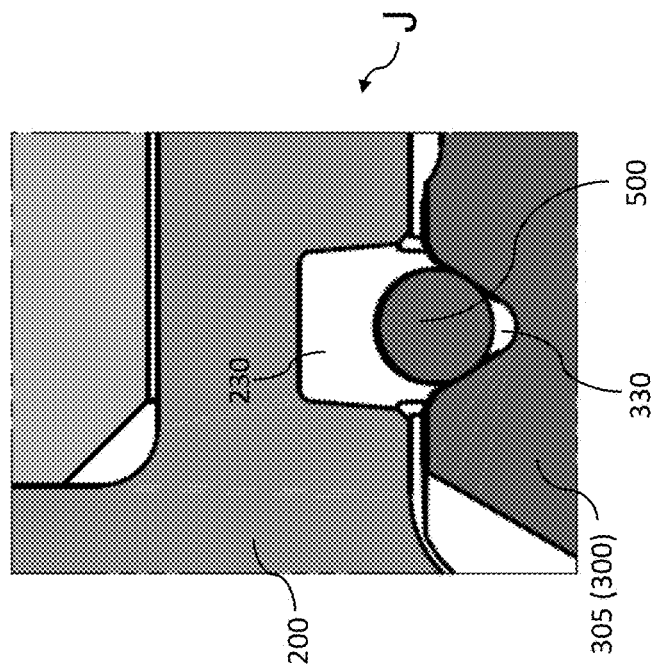
FIG. 14B is an enlarged view of an area J shown in FIG. 14A.
Figure 14A:
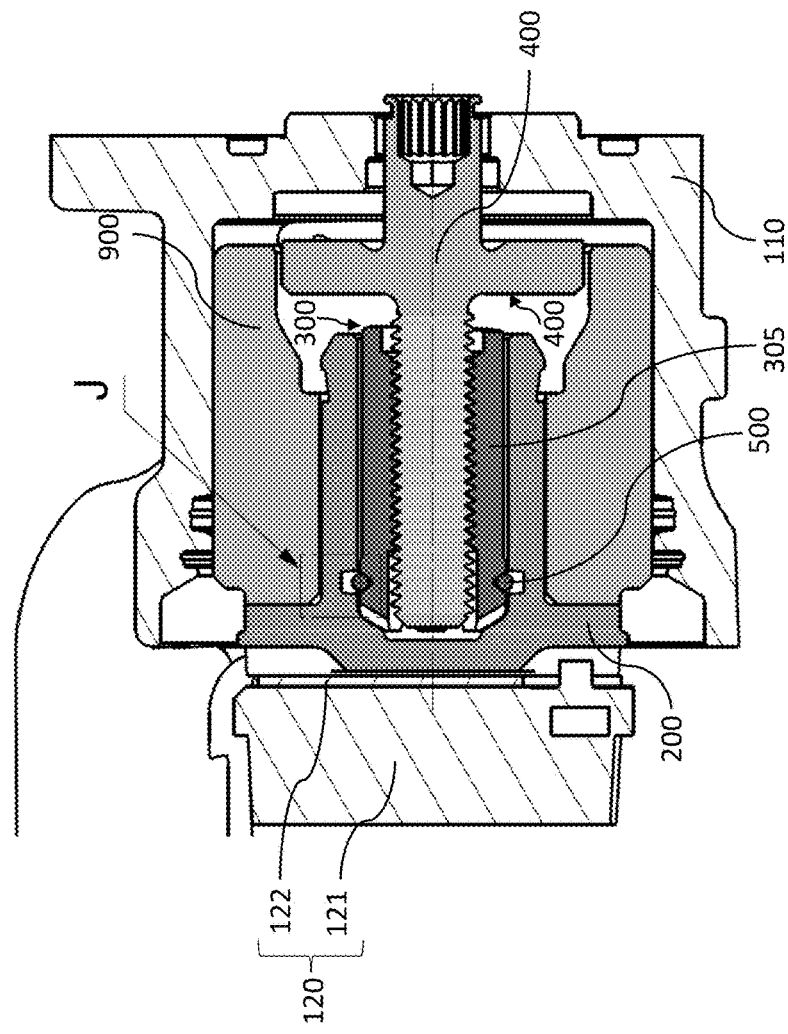
FIG. 14A is a cross-sectional view of illustrating an exemplary status of a brake assembly in which a brake piston is retracted by a restoring force of a resilient material mounted to a linearly movable structure during a brake release operation according to the second exemplary embodiment of the present disclosure.

FIGS. 8 to 14B illustrate a brake assembly according to a second exemplary embodiment of the present disclosure. FIG. 8 illustrates a cross-sectional view of a brake assembly according to the second exemplary embodiment of the present disclosure, FIG. 9 shows a cross-sectional view of a brake assembly taken at cross-section F-F of FIG. 8 according to the second exemplary embodiment of the present disclosure, FIG. 10A is a cross-sectional view of a brake assembly taken at cross-section G-G of FIG. 8 according to the second exemplary embodiment of the present disclosure, FIG. 10B is an enlarged view of an encircled portion H shown in FIG. 10A according to the second exemplary embodiment of the present disclosure, FIG. 11 is an exploded view of a brake assembly according to the second exemplary embodiment of the present disclosure, FIG. 12 is a cross-sectional and exploded view of a brake assembly according to the second exemplary embodiment of the present disclosure, FIG. 13A is a cross-sectional view of illustrating an exemplary status of a brake assembly in which a resilient material mounted to a linearly movable structure is compressed by an inner wall of a groove of a brake piston during a brake release operation according to the second exemplary embodiment of the present disclosure, FIG. 13B is an enlarged view of an area I shown in FIG. 13A, FIG. 14A is a cross-sectional view of illustrating an exemplary status of a brake assembly in which a brake piston is retracted by a restoring force of a resilient material mounted to a linearly movable structure during a brake release operation according to the second exemplary embodiment of the present disclosure, FIG. 14B is an enlarged view of an area J shown in FIG. 14A.

The exemplary embodiment of FIGS. 1 to 7B which is a metal piston type brake assembly may be implemented as a phenolic piston type brake assembly (for example, Phenolic MoC (Motor on Caliper) type brake assembly). An exemplary embodiment applied to a phenolic piston type brake assembly is illustrated in FIGS. 8 to 14B. The phenolic piston type brake assembly may offer advantages such as relatively low specific gravities and relatively low thermal conductivities.

In the phenolic piston type embodiment of FIGS. 8 to 14B, a phenolic outer layer 900 may be attached to the brake piston 200 (e.g. a steel core). The phenolic outer layer 900 may be positioned between the brake piston 200 (e.g. a steel core) and the brake caliper 110. The phenolic outer layer 900 may be attached to the brake piston 200 in a process known as overmolding, although it is not required. The brake piston 200 (i.e. a core) may be formed substantially of metal and the outer layer 900 attached to the brake piston 200 may be formed substantially of phenolic material. The phenolic outer layer 900 may be slidably movable together with the brake piston 200 with respect to the brake caliper 110.

The outer layer 900 may have a polymeric material, such as a thermosetting or thermoplastic polymer. Preferred polymeric material can include polymeric material made from a phenolic resin, or other appropriate polymeric material having suitable strength, rigidity, chemical resistance, low compressibility, and temperature capabilities for use in the environment of a disk brake piston. For example, a polymeric material having a temperature stability up to approximately 150° C., 200° C., 250° C. 300° C., 350° C. or higher can be favorably incorporated into the design. Suitable polymeric materials can be filled, such as glass fiber-filled, mineral-filled, metal-filled, and/or filled with other material appropriate for the strength temperature and durability requirements, or unfilled. Polymeric materials may be laminated and/or reinforced as desired. Suitable polymeric materials can include, but are not limited to, those made from phenolic resins such as novolacs and resols and include cross-linked forms of phenolic resins.

One or more caliper piston seals 910 may be positioned between the outer surface of the phenolic outer layer 900 and a brake caliper housing inner surface of the brake caliper 110 defining the inner caliper bore 115 and.

The brake caliper 110, the brake piston 200, the linearly movable structure 300, the rotatable structure 400, the resilient material 500, the actuator assembly 800, and their parts, components, and elements of the exemplary embodiment of FIGS. 8 to 14B can be constructed the same as or similar to those of the exemplary embodiment of FIGS. 1 to 7B described above. It should be understood that for structures, features, operations and functions not specifically discussed, those structures, features, operations and functions can be the same as or similar to the brake caliper 110, the brake piston 200, the linearly movable structure 300, the rotatable structure 400, the resilient material 500, the actuator assembly 800, and their parts, components, and elements of the exemplary embodiment of FIGS. 1 to 7B. Any elements not described in relation to this embodiment illustrated in FIGS. 8 to 14B can be found in the descriptions of those embodiments shown in FIGS. 1 to 7B described above.

Figure 15:
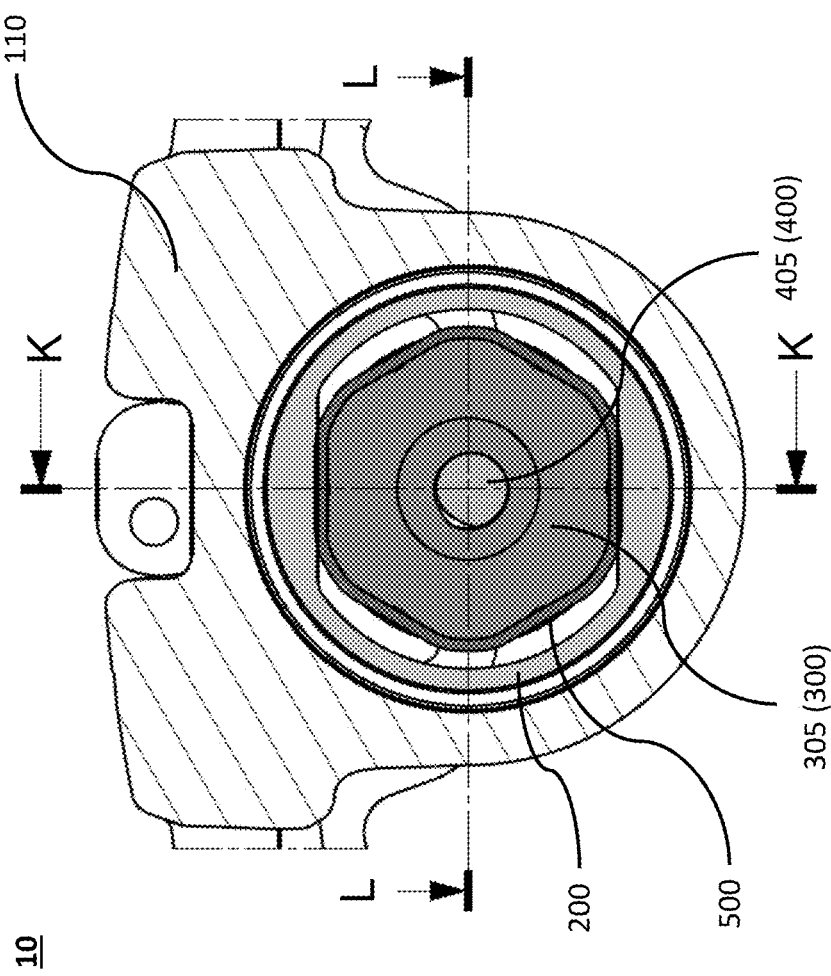
FIG. 15 illustrates a cross-sectional view of a brake assembly according to a third exemplary embodiment of the present disclosure.

Additionally, the groove 230 of the brake piston 200, the groove 330 of the spindle nut 305, and the resilient material 500 of the first and second exemplary embodiments illustrated in FIGS. 1 to 14B can be changed to various shapes. For example, a third exemplary embodiment of a brake assembly is shown in FIGS. 15 to 17. FIG. 15 illustrates a cross-sectional view of a brake assembly according to the third exemplary embodiment of the present disclosure, FIG.

Figure 16B:
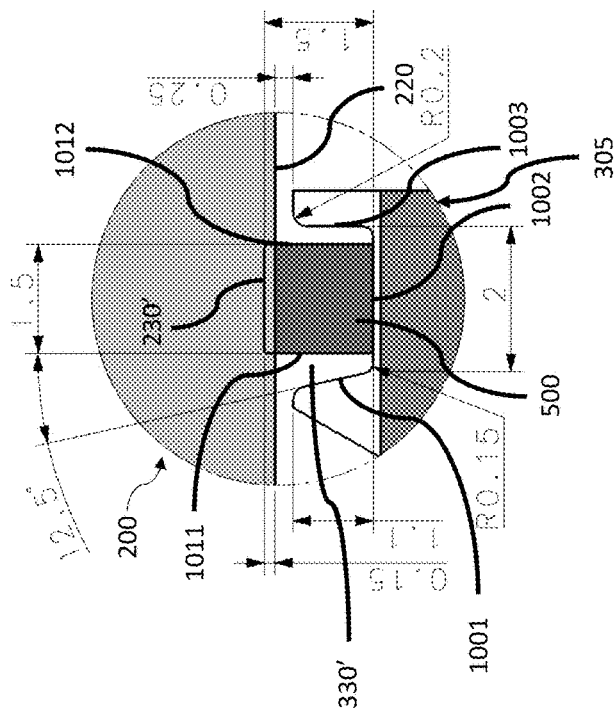
FIG. 16B is an enlarged view of an area M shown in FIG. 16A.
Figure 16A:
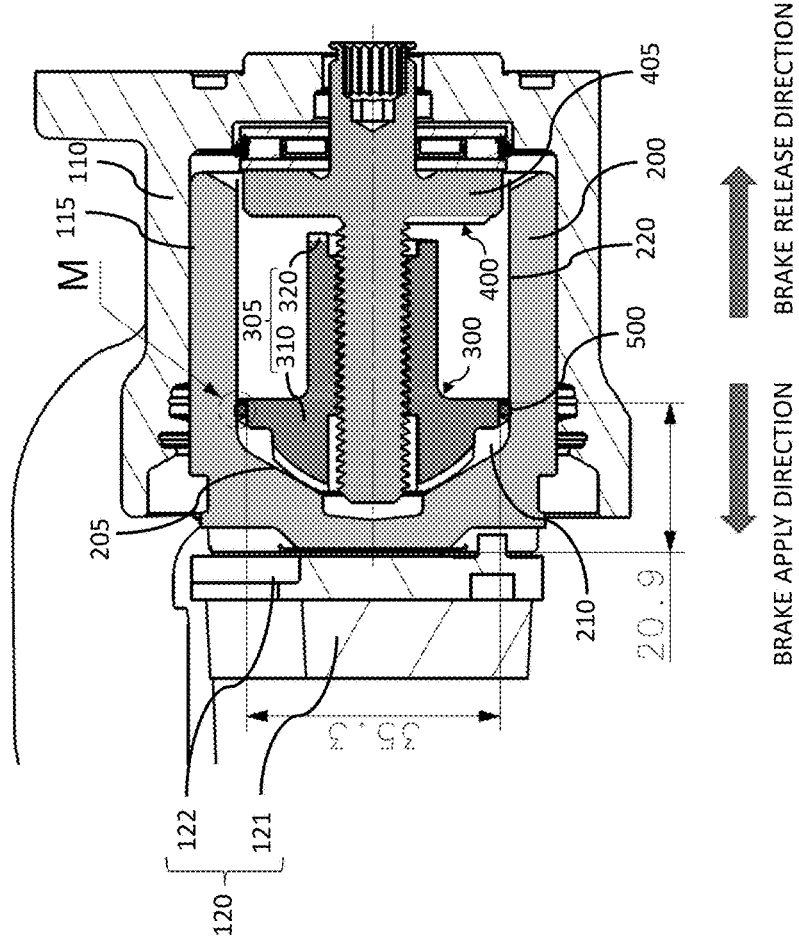
FIG. 16A shows a cross-sectional view of a brake assembly taken at cross-section K-K of FIG. 15 according to the third exemplary embodiment of the present disclosure.
Figure 17:
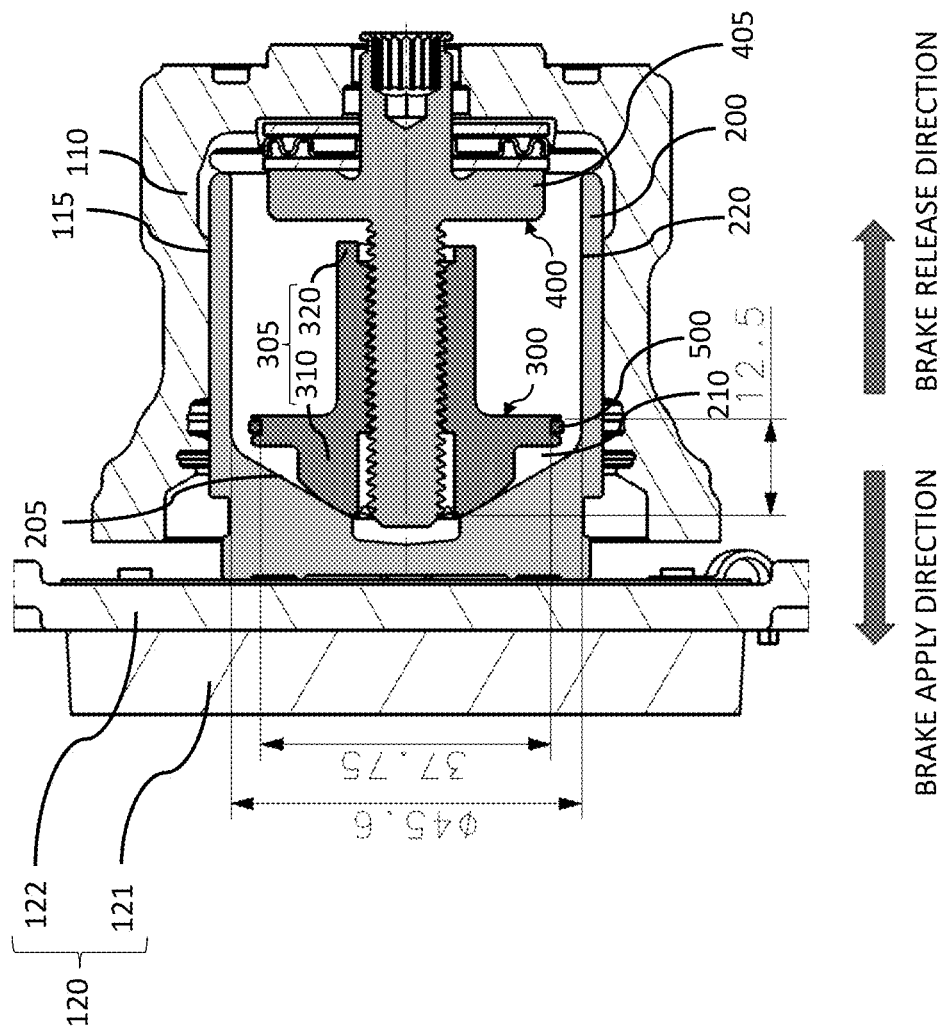
FIG. 17 shows a cross-sectional view of a brake assembly taken at cross-section L-L of FIG. 15 according to the third exemplary embodiment of the present disclosure.

16A shows a cross-sectional view of a brake assembly taken at cross-section K-K of FIG. 15 according to the third exemplary embodiment of the present disclosure, FIG. 16B is an enlarged view of an area M shown in FIG. 16A, and FIG. 17 shows a cross-sectional view of a brake assembly taken at cross-section L-L of FIG. 15 according to the third exemplary embodiment of the present disclosure.

In the first and second exemplary embodiments of FIGS. 1 to 14B, the resilient material 500 is fixed to the groove 330 of the spindle nut 305 while being movable within the groove 230' of the brake piston 200. However, alternatively, in the third exemplary embodiment of FIGS. 15 to 17, the resilient material 500 can be fixedly coupled to the groove 230' of the brake piston 200 so that the resilient material 500 is movable together with the brake piston 200. For example, the groove 230' of the brake piston 200 may have a mirrored shape with a part of the resilient material 500, which is inserted in the groove 230' of the brake piston 200, so that the part of the resilient material 500 can be fitted in the groove 230' of the brake piston 200. The cross-sectional shape of the groove 230' of the brake piston 200 may be, for example, but not limited to, a square or a trapezoid. However, the groove 230' of the brake piston 200 may have any shape that can be fixedly coupled with the resilient material 500.

At least a part of the resilient material 500 is movably located within the groove 330' of the spindle nut 305 formed on the outer surface of the spindle nut 305 such that the resilient material 500 can move within the groove 330' of the spindle nut 305. For example, the groove 330' of the spindle nut 305 may be formed by first, second, and third walls 1001, 1002, 1003. The resilient material 500 may directly contact the second wall 1002 of the groove 330' of the spindle nut 305 which may be parallel to the inner wall 220 of the brake piston 200, although it is not required. The first wall 1001 of the groove 330' of the spindle nut 305 positioned closer to the brake rotor 125 than the third wall 1003 of the groove 330' of the spindle nut 305 may be slanted or angled with respect to a surface 1011 of the resilient material 500 facing the first wall 1001 of the groove 330' of the spindle nut 305. An angle between the first wall 1001 of the groove 330' of the spindle nut 305 and the surface 1011 of the resilient material 500 facing the first wall 1001 of the groove 330' of the spindle nut 305 may be between 10° and 15°, preferably 12.5°, in order to smoothly push the brake piston 230 away from the brake rotor 125 when the resilient material 500 is deformed or squeezed by the first wall 1001 of the groove 330' of the spindle nut 305. The third wall 1003 of the groove 330' of the spindle nut 305 positioned farther than the first wall 1001 from the brake rotor 125 may be parallel to a surface 1012 of the resilient material 500 facing the third wall 1003 of the groove 330' of the spindle nut 305. However, the surfaces 1011 and 1012 of the resilient material 500 may be angled at any angle with respect to the first wall 1001 and the third wall 1003 of the groove 330' of the spindle nut 305, respectively if necessary. The cross-sectional shape of the resilient material 500 may be a square or trapezoid. However, the resilient material 500 may have any shape, for example, but not limited to, a circle, a half circle or oval, a polygon, or any shape that can be mourned to the groove 230' of the brake piston 200, be movable within the groove 330' of the spindle nut 305, and be deformed or squeezed by at least one wall or edge of the groove 330' of the spindle nut 305 when the resilient material 500 contacts the groove 330' of the spindle nut 305.

In operation, when the parking brake is released, the spindle nut 305 is retracted in a brake release direction away from brake rotor 125 in response to the rotation of the spindle 405, and the retraction of the spindle nut 305 causes the resilient material 500 to be deformed or squeezed by the friction of the resilient material 500 against the first wall 1001 of the groove 330' of the spindle nut 305. Then, the deformed resilient material 500 exerts a restoring force against the first wall 1001 of the groove 330' of the spindle nut 305, thereby pushing the brake piston 230 away from the brake rotor 125, and therefore the brake piston 230 can be retracted together with the linearly movable structure 300 (e.g. the spindle nut 305) by the resilient material 500. Accordingly, upon brake release, the brake piston 230 is forced back and retracted by the restoration force of the resilient material 500 against the first wall 1001 of the groove 330' of the spindle nut 305. Accordingly, the resilient material 500 advantageously assists in retracting the brake piston 230 to pull the brake piston to a pre-apply position and maintain a constant and repeatable air gap between the brake piston 230 and the brake rotor 125. The resilient material 500 can retract the brake piston 230 actively when the spindle nut 305 is retracted. The brake drag caused by contact forces between the brake pad assembly 120 and the brake rotor 125 due to insufficient retraction distance of the brake piston 230 during the brake release operation can be prevented, and therefore the brake piston retraction is improved.

The brake caliper 110, the brake piston 200, the linearly movable structure 300, the rotatable structure 400, the resilient material 500, the actuator assembly 800, and their parts, components, and elements of the exemplary embodiment of FIGS. 15 to 17 can be constructed the same as or similar to those of the exemplary embodiment of FIGS. 1 to 14B described above. It should be understood that for structures, features, operations and functions not specifically discussed, those structures, features, operations and functions can be the same as or similar to the brake caliper 110, the brake piston 200, the linearly movable structure 300, the rotatable structure 400, the resilient material 500, the actuator assembly 800, and their parts, components, and elements of the exemplary embodiment of FIGS. 1 to 14B. Any elements not described in relation to this embodiment illustrated in FIGS. 15 to 17 can be found in the descriptions of those embodiments shown in FIGS. 1 to 14B described above.

Although the example embodiments have been described in detail, it should be understood that various changes, substitutions and alterations can be made herein without departing from the spirit and scope of the present disclosure as defined by the appended claims.

Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding embodiments described herein may be utilized according to the embodiments and alternative embodiments. Accordingly, the appended claims are intended to include within their scope such processes, machines, manufacture, compositions of matter, means, methods, or steps.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A brake assembly comprising:
   a brake piston configured to be movable for a brake apply or release, the brake piston having an inner wall forming a piston cavity, wherein a groove is formed on the inner wall of the brake piston;
   a linearly movable structure positioned within the piston cavity of the brake piston, the linearly movable structure configured to be linearly movable within the piston cavity in response to rotation of a rotatable structure operably coupled to the linearly movable structure; and
   a resilient material, wherein at least a part of the resilient material is located within the groove formed on the inner wall of the brake piston and an other part of the resilient material is disposed on an outer surface of the linearly movable structure positioned within the piston cavity of the brake piston so that the resilient material is engageable with side walls of the groove formed on the inner wall of the brake piston to move the brake piston by a restoring force of the resilient material in response to linear movement of the linearly movable structure,
   wherein the resilient material does not contact a circumferential surface formed between the side walls of the groove of the brake piston so that the resilient material is movable between the side walls of the groove of the brake piston without contacting the side walls of the groove of the brake piston.

2. The brake assembly of claim 1, wherein the linearly movable structure positioned within the inner wall of the brake piston is a spindle nut, and the rotatable structure operably coupled to the linearly movable structure is a spindle.

3. The brake assembly of claim 1, wherein the resilient material fixed to the outer surface of the linearly movable structure is configured to be at least partially deformable in an area of contact with one of the side walls of the groove formed on the inner wall of the brake piston and move the brake piston by the restoring force of the resilient material against one of the side walls of the groove formed on the inner wall of the brake piston.

4. The brake assembly of claim 1, wherein the resilient material disposed on the outer surface of the linearly movable structure is configured to retract the brake piston during the brake release.

5. The brake assembly of claim 1, wherein the other part of the resilient material is disposed in another groove formed on the outer surface of the linearly movable structure, and the at least part of the resilient material is positioned within the groove formed on the inner wall of the brake piston.

6. The brake assembly of claim 1, wherein the linearly movable structure comprises a head portion configured to contact the brake piston during the brake apply, and a body portion extended from the head portion of the linearly movable structure, wherein an outer diameter of the head portion of the linearly movable structure is larger than an outer diameter of the body portion of the linearly movable structure, and the resilient material is mounted to the head portion of the linearly movable structure.

7. The brake assembly of claim 6, wherein one or more holes are formed at the head portion of the linearly movable structure.

8. The brake assembly of claim 1, wherein the resilient material is mounted to a portion of the linearly movable structure where an outer diameter of the linearly movable structure is largest.

9. The brake assembly of claim 1, wherein the resilient material has a shape of an O-ring.

10. The brake assembly of claim 1, wherein the resilient material has a shape of a polygonal ring.

11. The brake assembly of claim 1, wherein the groove formed on the inner wall of the brake piston has a space that the resilient material is movable therein.

12. A brake assembly comprising:
   a caliper having a caliper cavity;
   a brake pad coupled to the caliper;
   a brake piston mounted in the caliper cavity and configured to be movable to displace the brake pad for a brake apply or release, the brake piston having an inner wall forming a piston cavity, wherein a groove is formed on the inner wall of the brake piston;
   a spindle nut positioned within the piston cavity of the brake piston, the spindle nut configured to be linearly movable within the piston cavity in response to rotation of a spindle;
   the spindle operably coupled to the spindle nut; and a resilient material, wherein at least a part of the resilient material is located within the groove formed on the inner wall of the brake piston and an other part of the resilient material is disposed on an outer surface of the spindle nut positioned within the piston cavity of the brake piston so that the resilient material is engageable with side walls of the groove formed on the inner wall of the brake piston to move the brake piston by a restoring force of the resilient material in response to linear movement of the spindle nut, wherein the resilient material does not contact a circumferential surface formed between the side walls of the groove of the brake piston so that the resilient material is movable between the side walls of the groove of the brake piston without contacting the side walls of the groove of the brake piston.

13. The brake assembly of claim 12, wherein the resilient material fixed to the outer surface of the spindle nut is configured to be at least partially deformable in an area of contact with one of the side walls of the groove formed on the inner wall of the brake piston so that the resilient material exerts the restoring force against one of the side walls of the groove formed on the inner wall of the brake piston to move the brake piston.

14. The brake assembly of claim 12, wherein the resilient material disposed on the outer surface of the spindle nut is configured to retract the brake piston during the brake release so that the brake pad is retracted in a direction away from a brake rotor.

15. The brake assembly of claim 12, wherein the other part of the resilient material is disposed in another groove formed on the outer surface of the spindle nut, and the at least a part of the resilient material is located within the groove formed on the inner wall of the brake piston.

16. The brake assembly of claim 12, wherein the spindle nut comprises a head portion configured to contact the brake piston during the brake apply, and a body portion extended from the head portion of the spindle nut, wherein an outer diameter of the head portion of the spindle nut is larger than an outer diameter of the body portion of the spindle nut, and the resilient material is mounted to the head portion of the spindle nut.

17. The brake assembly of claim 16, wherein one or more holes are formed at the head portion of the spindle nut.

18. The brake assembly of claim 12, wherein the resilient material is mounted to a portion of the spindle nut where an outer diameter of the spindle nut is largest.

19. The brake assembly of claim 12, wherein the resilient material has a shape of an O-ring or a polygonal ring.

20. The brake assembly of claim 12, wherein the groove formed on the inner wall of the brake piston has a space that the resilient material is movable therein.

* * * * *